US012600015B2

(12) United States Patent
Lee

(10) Patent No.: US 12,600,015 B2
(45) Date of Patent: Apr. 14, 2026

(54) BOX-END TOOL STRUCTURE

(71) Applicant: Chien-Ying Lee, Taichung (TW)

(72) Inventor: Chien-Ying Lee, Taichung (TW)

( * ) Notice: Subject to any disclaimer, the term of this patent is extended or adjusted under 35 U.S.C. 154(b) by 338 days.

(21) Appl. No.: 18/431,745

(22) Filed: Feb. 2, 2024

(65) Prior Publication Data

US 2025/0249554 A1 Aug. 7, 2025

(51) Int. Cl.
*B25B 13/46* (2006.01)

(52) U.S. Cl.
CPC .................................. *B25B 13/468* (2013.01)

(58) Field of Classification Search
CPC ......... B25B 13/02; B25B 13/06; B25B 13/10; B25B 13/105; B25B 13/107; B25B 13/18; B25B 13/20; B25B 13/46; B25B 13/463; B25B 13/48; B25B 13/481; B25B 13/58; B25B 21/002; B25B 21/004; B25B 23/0007; B25B 23/0035; B25B 23/0057; B25B 23/0064; B25B 23/0071; B25B 23/142; B25B 23/16; B25G 3/02; B25G 3/06; B25G 3/08; B25G 3/12; B25G 3/18; B25G 3/24; B25G 3/30; B25G 3/36; B25G 3/38
See application file for complete search history.

(56) References Cited

U.S. PATENT DOCUMENTS

| | | | | |
|---|---|---|---|---|
| 2,651,230 | A | 9/1953 | Waterval | |
| 9,205,538 | B2 * | 12/2015 | Yang | B25B 13/461 |
| 10,744,623 | B2 * | 8/2020 | Yang | H04W 36/0016 |
| 12,447,589 | B2 * | 10/2025 | Chun | B25B 23/0035 |

* cited by examiner

*Primary Examiner* — Robert J Scruggs
(74) *Attorney, Agent, or Firm* — Justin Lampel

(57) ABSTRACT

A box-end tool structure includes a first body, a second body, two third body modules, and a fourth body. The first body is provided with a first end, a second end, two first receiving grooves, a first face, two second faces, and a first slot. The second body is mounted on the first body and provided with a first mounting portion and two third faces. The two third body modules are moved in the first slot linearly and simultaneously to be close to or away from the second body. One of the third body modules is mounted on the first end, and the other one of the third body modules is mounted on the second end. Each of the third body modules includes a first locking member, a second locking member, a first elastic member, and a first push member.

11 Claims, 12 Drawing Sheets

BOX-END TOOL STRUCTURE

BACKGROUND OF THE INVENTION

Field of the Invention

The present invention relates to a hand tool and, more particularly, to a box-end or box-type tool structure.

Description of the Related Art

A conventional box-type wrench structure was disclosed in the U.S. Pat. No. 2,651,230, and comprises a box wrench 10 provided with a mounting portion. The mounting portion is a polygonal recess. The mounting portion is provided with an orifice 24 for mounting a ball 25 which is pushed by a spring 26. A socket wrench driving head 11 has an outer peripheral face provided with an outside annular groove 13. When the socket wrench driving head 11 is mounted in the mounting portion of the box wrench 10, the ball 25 is pushed by the spring 26, so that the ball 25 is locked in the outside annular groove 13, to prevent the socket wrench driving head 11 from being detached from the box wrench 10.

However, such a conventional box-type wrench structure has the following disadvantages.

1. The socket wrench driving head 11 is only provided with an outside annular groove 13. When the socket wrench driving head 11 is mounted on the box wrench 10, the socket wrench driving head 11 and the box wrench 10 are locked by the ball 25 only, so that the socket wrench driving head 11 is not mounted on the box wrench 10 firmly and steadily. Thus, the socket wrench driving head 11 is easily detached from the box wrench 10 during operation, thereby causing inconvenience to the user. In addition, when the socket wrench driving head 11 drops from a high location, the socket wrench driving head 11 will possibly do damage to other people.
2. When the socket wrench driving head 11 is mounted on the box wrench 10, only the ball 25 is locked in the outside annular groove 13. Thus, the ball 25 is easily worn out during a long-term utilization so that the socket wrench driving head 11 is not locked on the box wrench 10 exactly.

BRIEF SUMMARY OF THE INVENTION

In accordance with the present invention, there is provided a box-end tool structure comprising a first body, a second body, two third body modules, and a fourth body. The first body is provided with a first end, a second end, two first receiving grooves, a first face, two second faces, and a first slot. The second body is mounted on the first body. The second body is provided with a first mounting portion and two third faces. The two third body modules are mounted on the first slot. The two third body modules are moved in the first slot linearly and simultaneously to be close to or away from the second body. One of the two third body modules is mounted on the first end, and the other one of the two third body modules is mounted on the second end. Each of the two third body modules includes a first locking member, a second locking member, a first elastic member, and a first push member.

According to the primary advantages of the present invention, the first locking portion of one of the two third body modules is locked in the first annular groove, and the first locking portion of the other one of the two third body modules is locked in the second annular groove, so that the fourth body and the first body have two locking positions and are locked firmly.

According to another advantage of the present invention, the first locking member of one of the two third body modules is mounted on the first end, and the first locking member of the other one of the two third body modules is mounted on the second end, so that the fourth body is locked by the first locking members of the two third body modules from the first end and the second end of the first body. Thus, the first body and the fourth body are locked exactly.

According to a further advantage of the present invention, the two third body modules are assembled and moved simultaneously, so that the user only needs to drive one of the two third body modules to move the two third body modules simultaneously.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
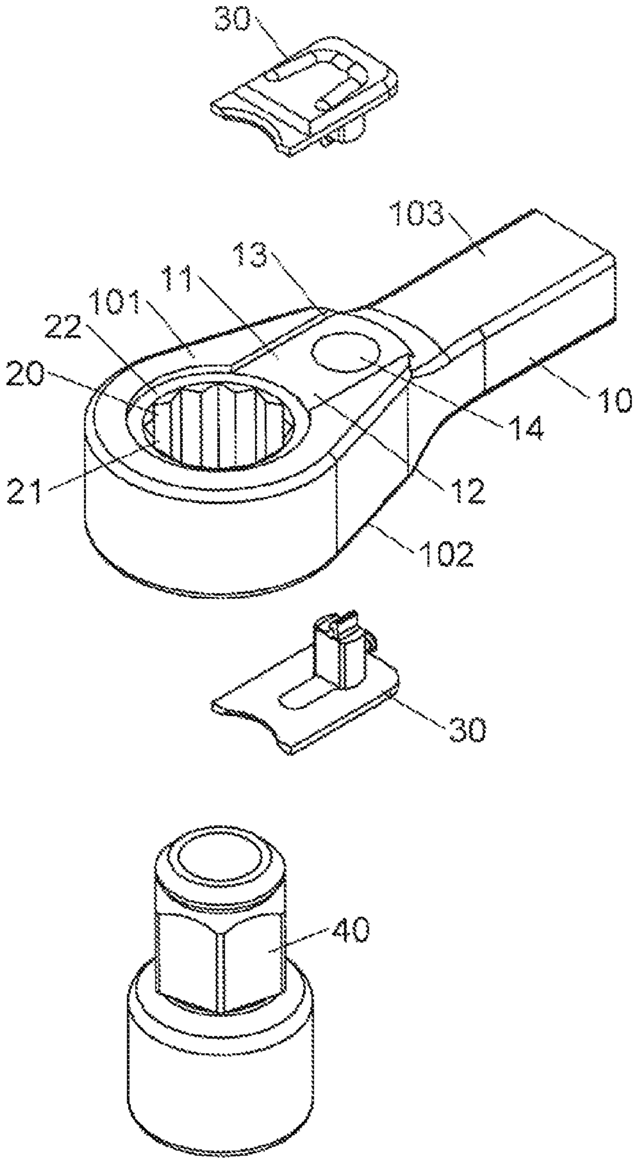
FIG. 1 is an exploded perspective view of a box-end tool structure in accordance with the preferred embodiment of the present invention.

Referring to the drawings and initially to FIGS. 1-8, a box-end tool structure in accordance with the preferred embodiment of the present invention comprises a first body 10, a second body 20, two third body modules 30, and a fourth body 40.

The first body 10 is a ratchet wrench, a one-way ratchet wrench or a box end wrench. The first body 10 is provided with a first end 101, a second end 102, and a third end 103. The first end 101 and the second end 102 are opposite to each other. The third end 103 is provided with a handle held by a user. The first body 10 is provided with two first receiving grooves 11 formed in the first end 101 and the second end 102 respectively. The two first receiving grooves 11 are arranged symmetrically relative to the first body 10. Each of the two first receiving grooves 11 is provided with a first face 12 and two second faces 13. The first face 12 has a planar shape. The two second faces 13 are arranged symmetrically relative to the first face 12. An angle (such as a right angle) is defined between each of the two second faces 13 and the first face 12. The first body 10 is provided with a first slot 14 penetrating the first body 10. The first slot 14 has a circular shape and is connected to the two first receiving grooves 11.

The second body 20 is mounted (or pivotally mounted) on the first body 10. The second body 20 is a ratchet wheel structure that is one-way rotatable relative to the first body 10. The second body 20 is provided with a first mounting portion 21 distant from the first slot 14. The first mounting portion 21 is a noncircular (or polygonal) recess. The second body 20 is provided with two third faces 22 formed on two ends of the second body 20. Each of the two third faces 22 has a planar shape and is flush with the first face 12 of one of the two first receiving grooves 11.

The two third body modules 30 are mounted on the first slot 14. The two third body modules 30 are moved in the first slot 14 linearly and simultaneously to be close to or away from the second body 20. One of the two third body modules 30 is mounted on the first end 101, and the other one of the two third body modules 30 is mounted on the second end 102. The two third body modules 30 are arranged symmetrically relative to the first body 10.

Each of the two third body modules 30 includes a first locking member 31, a second locking member 32, a first elastic member 33, and a first push member 34.

The first locking member 31 is received in one of the two first receiving grooves 11 and moved linearly on the first face 12. The first locking member 31 is provided with a first locking portion 311 close to the first mounting portion 21. The first locking portion 311 is a flange with a concave face. The first locking portion 311 is provided with a first inclined face 312 directed outward relative to the first body 10. The first inclined face 312 of one of the two third body modules 30 is directed toward an outside of the first end 101, and the first inclined face 312 of the other one of the two third body modules 30 is directed toward an outside of the second end 102. The first inclined faces 312 of the two third body modules 30 are arranged symmetrically relative to the first body 10.

The first locking member 31 is provided with a second mounting portion 313 that is distant from the first locking portion 311 and penetrates the first locking member 31. The second mounting portion 313 is a noncircular groove. The first locking member 31 is provided with two fourth faces 314 aligning with and sliding relative to the two second faces 13. The first locking member 31 is provided with a third mounting portion 315 penetrating the first locking member 31 and connected to the second mounting portion 313. The third mounting portion 315 is a noncircular groove.

The second locking member 32 is assembled with the first locking member 31 and provided with a fourth mounting portion 321. The fourth mounting portion 321 is mounted in the second mounting portion 313 so that the second locking member 32 and the first locking member 31 are moved simultaneously. The fourth mounting portion 321 is movably mounted in the first slot 14 and hidden in the first body 10. The second locking member 32 is provided with a second receiving groove 322 having an opening directed toward a direction opposite to the second body 20. Preferably, the opening of the second receiving groove 322 is directed toward the third end 103. The second receiving groove 322 has a circular shape.

The fourth mounting portion 321 has a distal end provided with a first hooked portion 323. The first hooked portion 323 has a projected shape and is provided with a first fixing (or fastening) section 3231. The second locking member 32 is provided with a second hooked portion 324 close to the first hooked portion 323. The second hooked portion 324 has a recessed shape and is provided with a second fixing (or fastening) section 3241. The second hooked portion 324 is provided with an open end 3242 having an opening directed in a direction the same as that of the opening of the second receiving groove 322. The second hooked portion 324 is provided with a closed end 3243 having a planar shape.

The second hooked portion 324 of one of the two third body modules 30 is hooked with the first hooked portion 323 of the other one of the two third body modules 30 so that the two third body modules 30 are assembled. The second fixing section 3241 of one of the two third body modules 30 is hooked with the first fixing section 3231 of the other one of the two third body modules 30 so that the two third body modules 30 are assembled.

The second locking member 32 is provided with a fifth mounting portion 325 mounted in the third mounting portion 315. The second locking member 32 is provided with a first projection 326 that is moved by a user's hand. Preferably, the first projection 326 is a protruding block with various stripes.

The first elastic member 33 is received in the second receiving groove 322 to provide a restoring effect to each of the two third body modules 30. Preferably, the first elastic member 33 is a spring.

The first push member 34 is assembled with the first elastic member 33 and received in the second receiving groove 322. The first elastic member 33 is elastically biased between the second receiving groove 322 and the first push member 34. The first push member 34 has an end pressing an inner peripheral face of the first slot 14.

When the two third body modules 30 are assembled with the first body 10, each of the two third body modules 30 is assembled previously, with the second mounting portion 313 being mounted on the fourth mounting portion 321, the third mounting portion 315 being mounted on the fifth mounting portion 325, and the first elastic member 33 and the first push member 34 being mounted in the second receiving groove 322.

Figure 6:
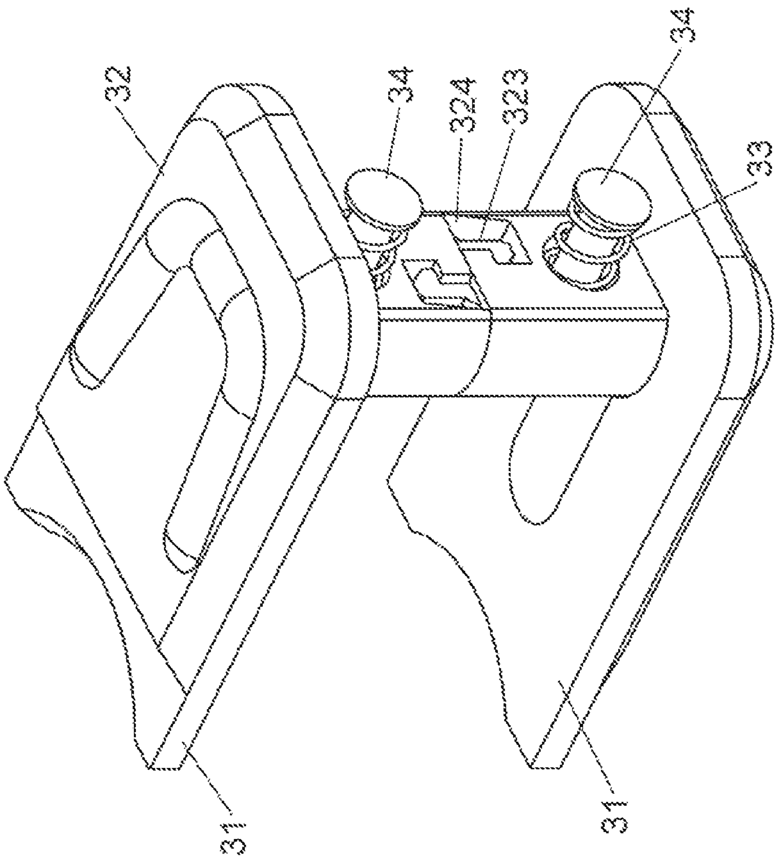
FIG. 6 is a perspective assembly view of two third body modules of the box-end tool structure in accordance with the preferred embodiment of the present invention.

The fourth mounting portions 321 of the two third body modules 30 are inserted into the first slot 14 and align with each other, with the second hooked portion 324 of one of the two third body modules 30 being hooked with the first hooked portion 323 of the other one of the two third body modules 30, and the second fixing section 3241 of one of the two third body modules 30 being hooked with the first fixing section 3231 of the other one of the two third body modules 30, so that the two third body modules 30 are assembled by the first fixing section 3231 and the second fixing section 3241. Thus, the two third body modules 30 are limited in the first slot 14 and cannot be detached from each other as shown in FIG. 6.

The fourth body 40 is a box-type hand tool. The fourth body 40 is provided with a sixth mounting portion 41 mounted in or released from the first mounting portion 21. The sixth mounting portion 41 is a noncircular (hexagonal or polygonal) shank. The fourth body 40 is provided with a first annular groove 42 and a second annular groove 43. The sixth mounting portion 41 is arranged between the first annular groove 42 and the second annular groove 43. The first locking member 31 of each of the two third body modules 30 is locked in the first annular groove 42 or the second annular groove 43. The first annular groove 42 and the second annular groove 43 have the same diameter and the same structure.

The fourth body 40 has an end provided with a second inclined face 44. The fourth body 40 is provided with a first peripheral face 45 having a diameter more than that of the first annular groove 42. The first peripheral face 45 has an annular shape. The fourth body 40 is provided with a first locking face 46 having a planar shape. The fourth body 40 is provided with a third inclined face 47. The third inclined face 47 and the second inclined face 44 are directed in the same direction. The fourth body 40 is provided with a second locking face 48 having a planar shape. The second inclined face 44, the first peripheral face 45, the first locking face 46, the first annular groove 42, the third inclined face 47, the sixth mounting portion 41, the second locking face 48, and the second annular groove 43 are arranged serially on the fourth body 40 from top to bottom.

Figure 7:
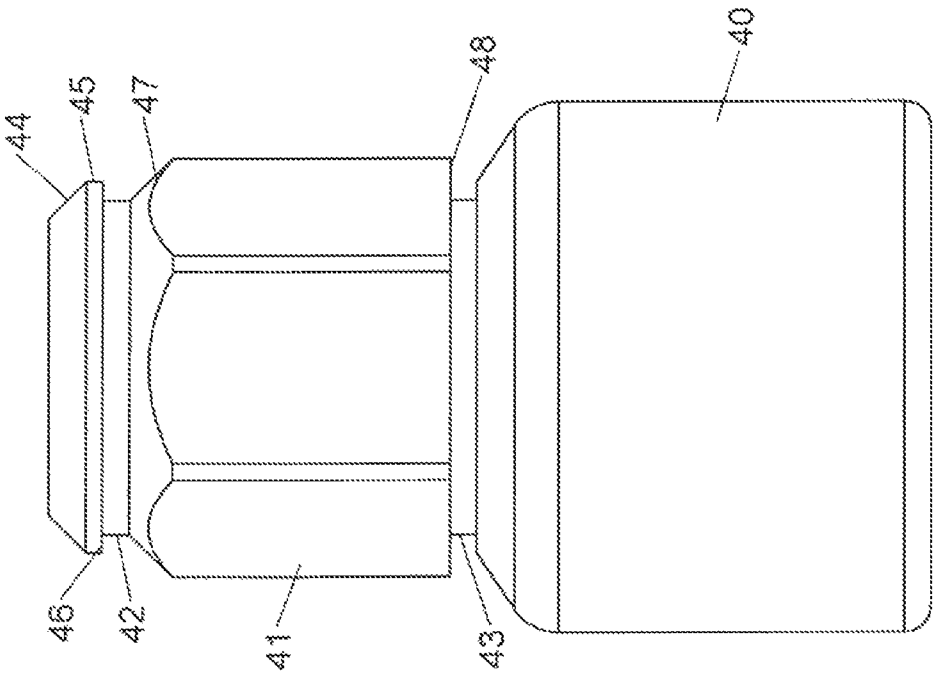
FIG. 7 is a side view of a fourth body of the box-end tool structure in accordance with the preferred embodiment of the present invention.
Figure 8:
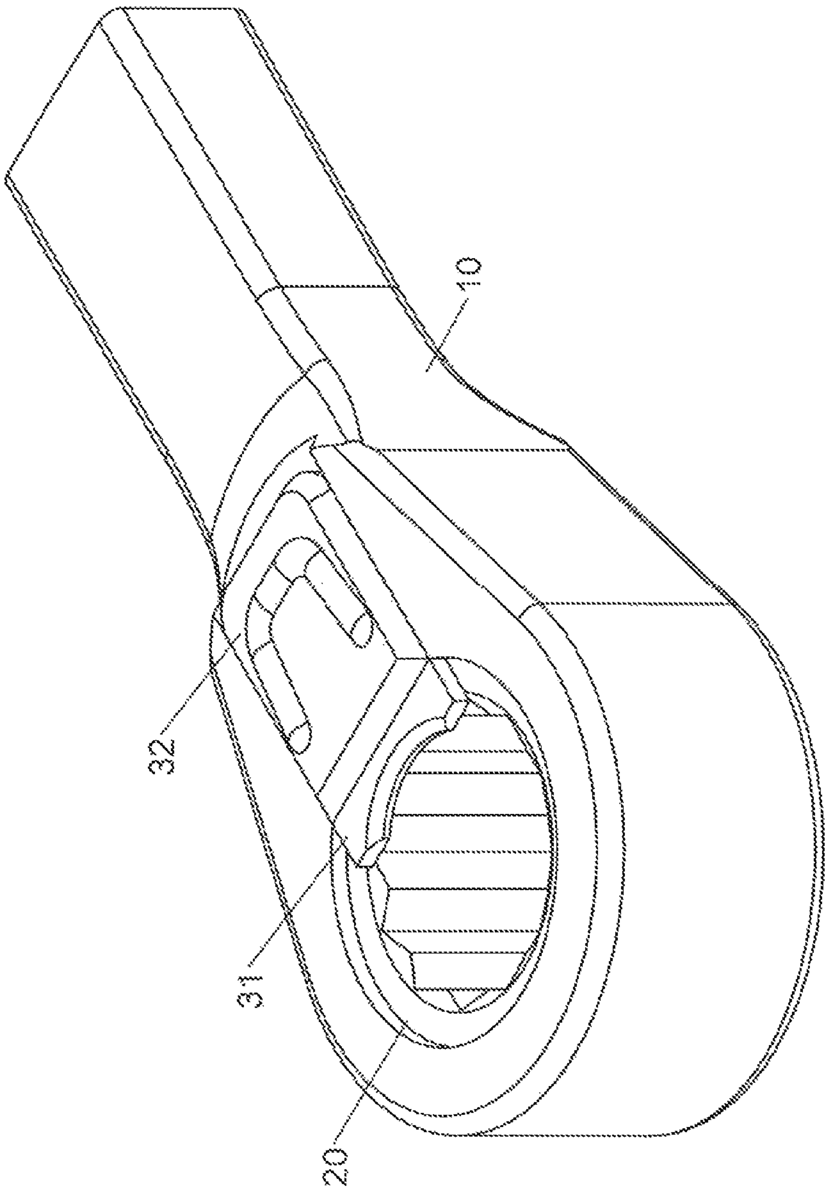
FIG. 8 is a perspective view of the box-end tool structure in accordance with the preferred embodiment of the present invention.

Referring to FIG. 8 with reference to FIGS. 1-7, the second body 20 is mounted on an end of the first body 10, the two third body modules 30 are mounted in the first slot 14, and the first locking member 31 and the second locking member 32 of each of the two third body modules 30 are mounted in one of the two first receiving grooves 11.

Figure 9:
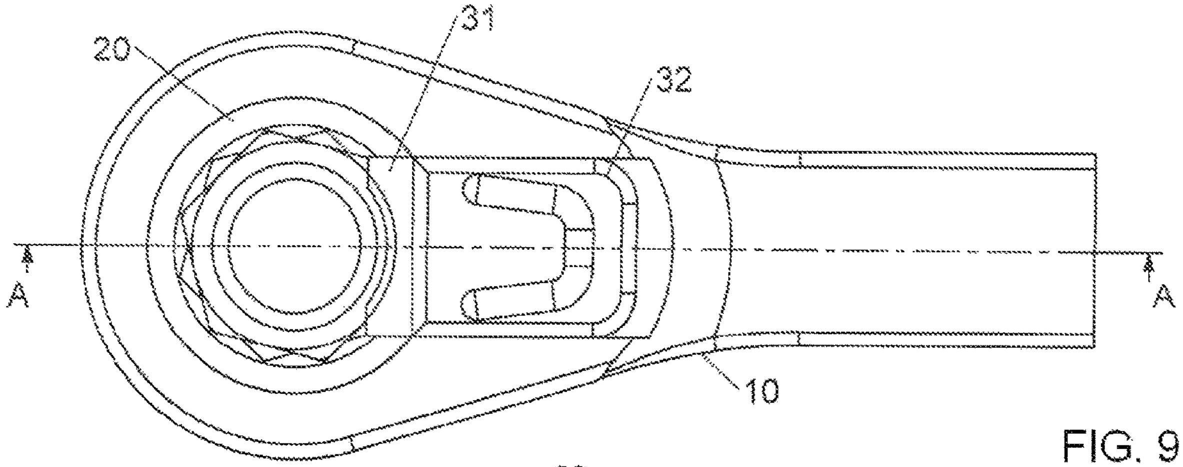
FIG. 9 is a top view showing a first operation state of the box-end tool structure in accordance with the preferred embodiment of the present invention.
Figure 10:
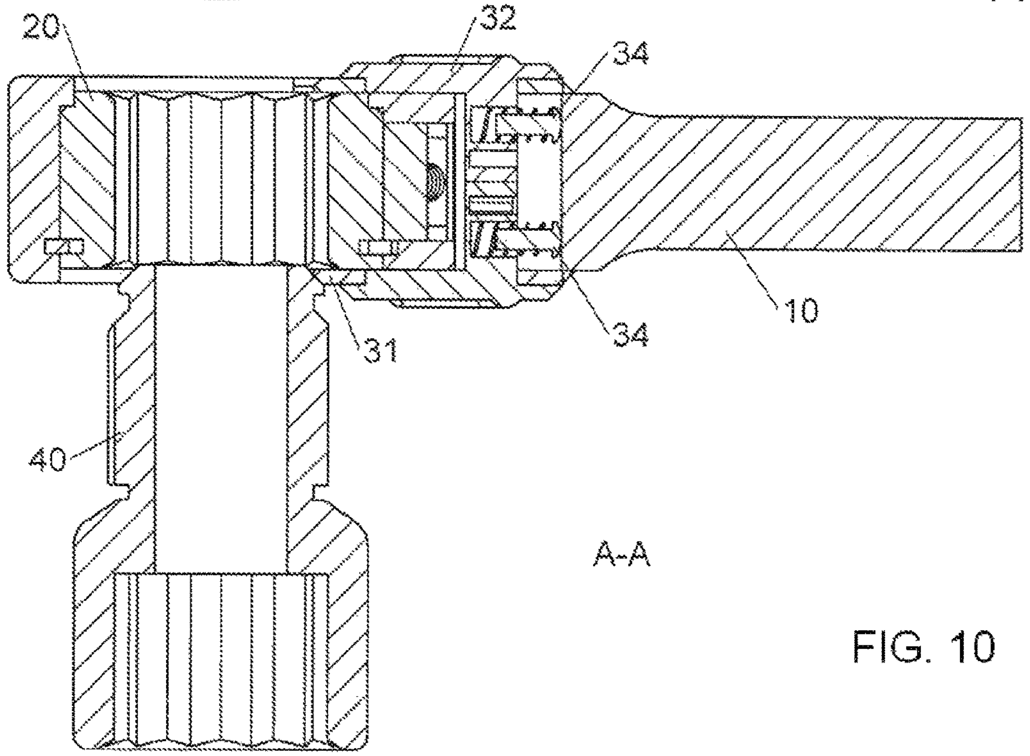
FIG. 10 is a cross-sectional view of the box-end tool structure taken along line A-A as shown in FIG. 9.
Figure 11:
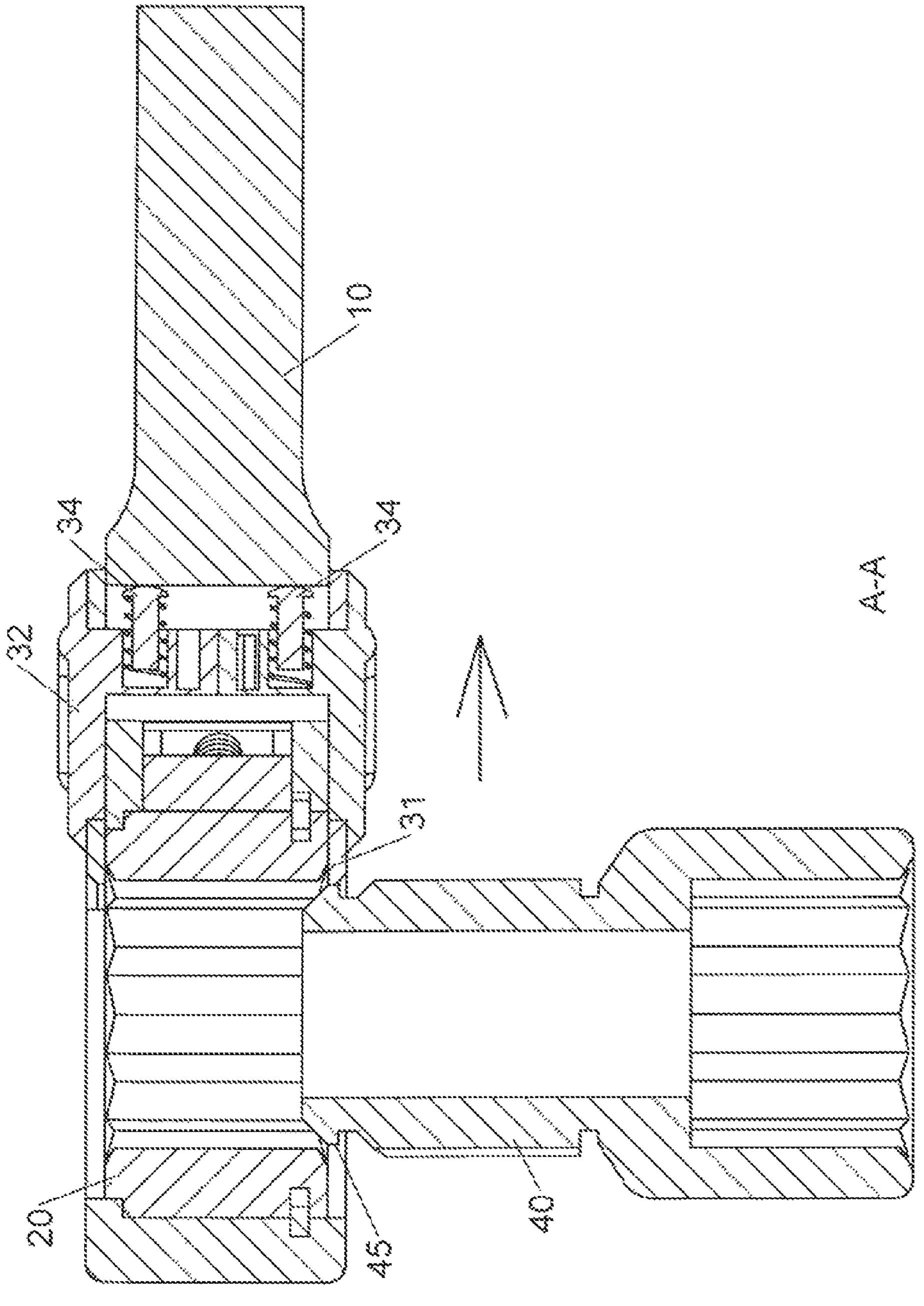
FIG. 11 is a cross-sectional view showing a second operation state of the box-end tool structure in accordance with the preferred embodiment of the present invention.

In operation, referring to FIGS. 9-11 with reference to FIGS. 1-8, when the second body 20 is mounted on the fourth body 40, the sixth mounting portion 41 is inserted into the first mounting portion 21, and the first inclined face 312 is pressed and pushed by the second inclined face 44, so that the first locking member 31 is driven to move the second locking member 32 toward the third end 103 as indicated by the arrow in FIG. 11, and the first elastic member 33 is compressed by the second locking member 32.

Figure 12:
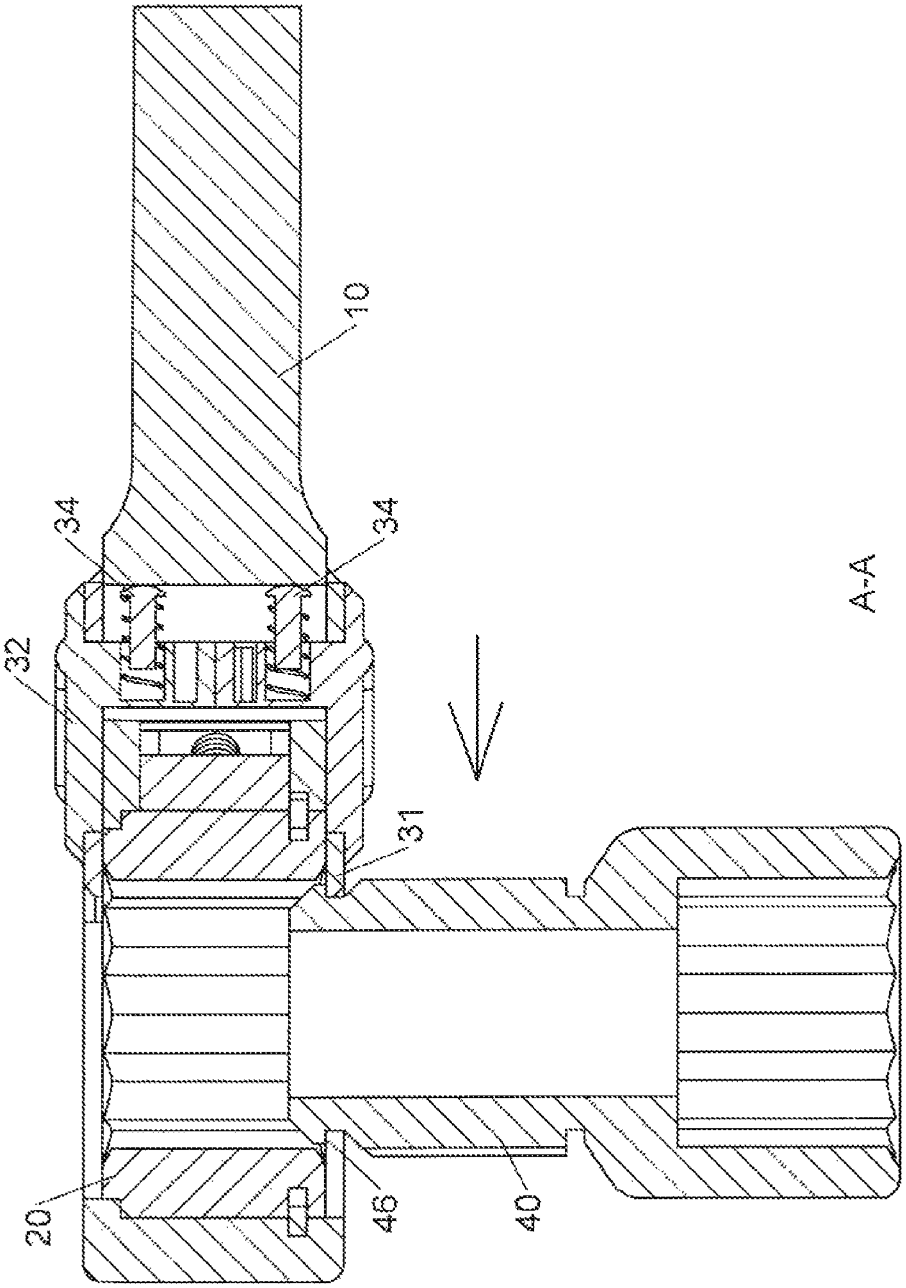
FIG. 12 is a cross-sectional view showing a third operation state of the box-end tool structure in accordance with the preferred embodiment of the present invention.

Referring to FIG. 12 with reference to FIGS. 1-11, after the second inclined face 44 and the first peripheral face 45 passes the first locking portion 311, the fourth body 40 is moved successively, and the first locking member 31 and the second locking member 32 are elastically pushed by the first elastic member 33 and moved toward the second body 20 as indicated by the arrow in FIG. 12, so that the first locking portion 311 is inserted into and locked in the first annular groove 42.

Figure 13:
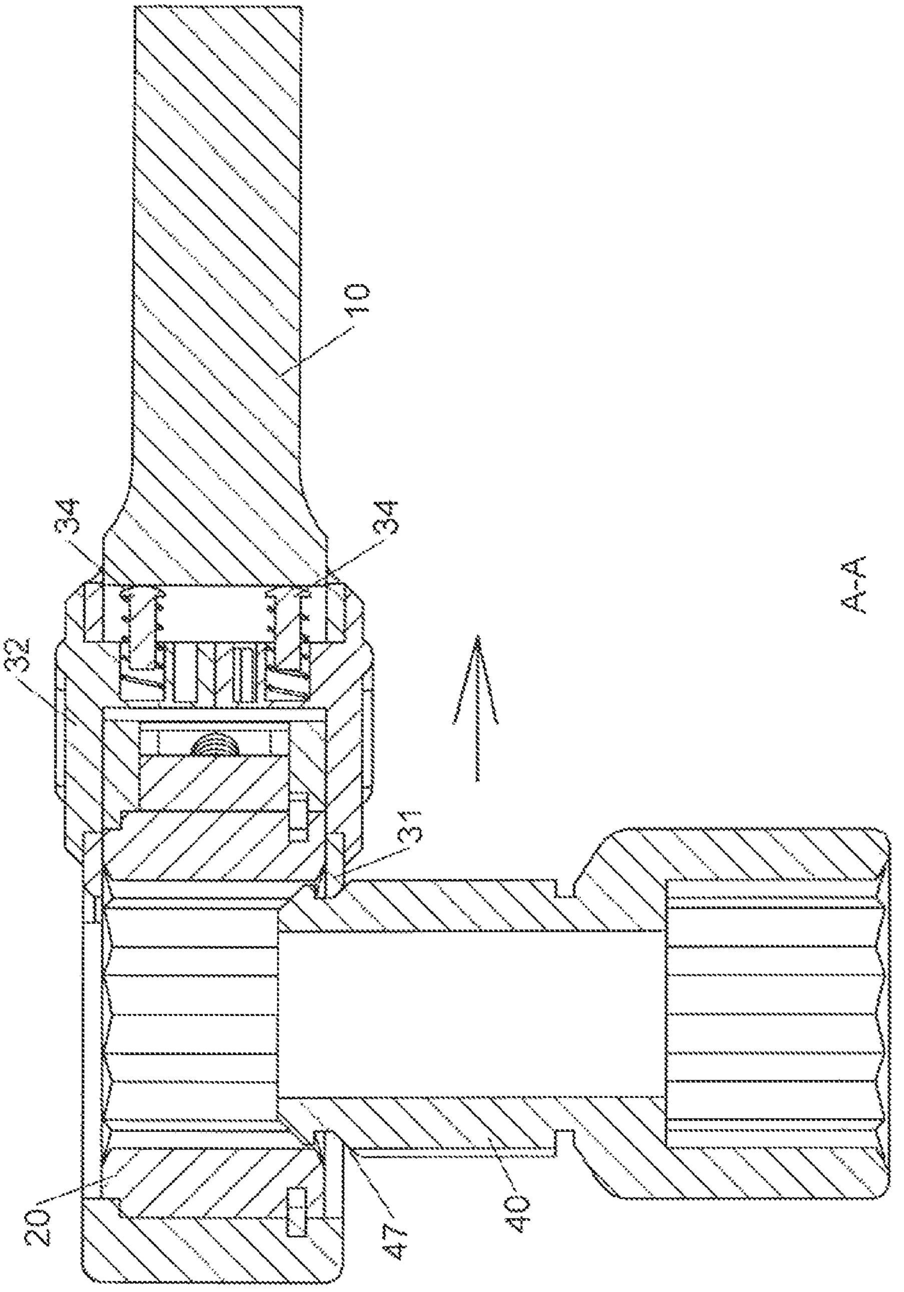
FIG. 13 is a cross-sectional view showing a fourth operation state of the box-end tool structure in accordance with the preferred embodiment of the present invention.
Figure 14:
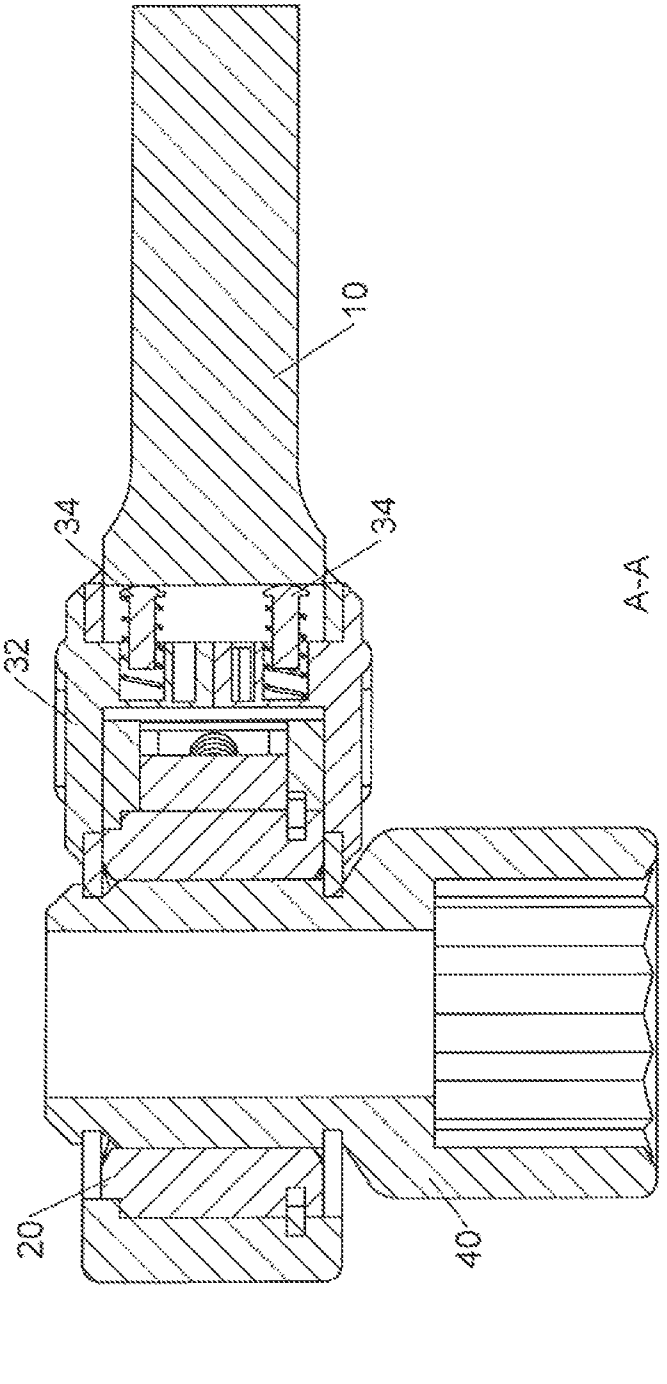
FIG. 14 is a cross-sectional view showing a fifth operation state of the box-end tool structure in accordance with the preferred embodiment of the present invention.

Referring to FIGS. 13 and 14 with reference to FIGS. 1-12, when the fourth body 40 is further moved toward the first mounting portion 21, the first inclined face 312 is pressed and pushed by the third inclined face 47, so that each of the two third body modules 30 is driven and moved toward the third end 103 as indicated by the arrow in FIG. 13. When the sixth mounting portion 41 passes the first locking member 31, the first locking face 46 is locked by the first locking portion 311 of one of the two third body modules 30, and the second locking face 48 is locked by the first locking portion 311 of the other one of the two third body modules 30 as shown in FIG. 14, so that the fourth body 40 is locked by the first body 10 and retained in the first mounting portion 21.

When one of the two third body modules 30 is moved by the user's hand, the two third body modules 30 are moved simultaneously, so that the first locking face 46 is unlocked from the first locking portion 311 of one of the two third body modules 30, and the second locking face 48 is unlocked from the first locking portion 311 of the other one of the two third body modules 30, to unlock the fourth body 40 from the first body 10. Thus, the fourth body 40 can be removed from the first mounting portion 21.

Figure 15:
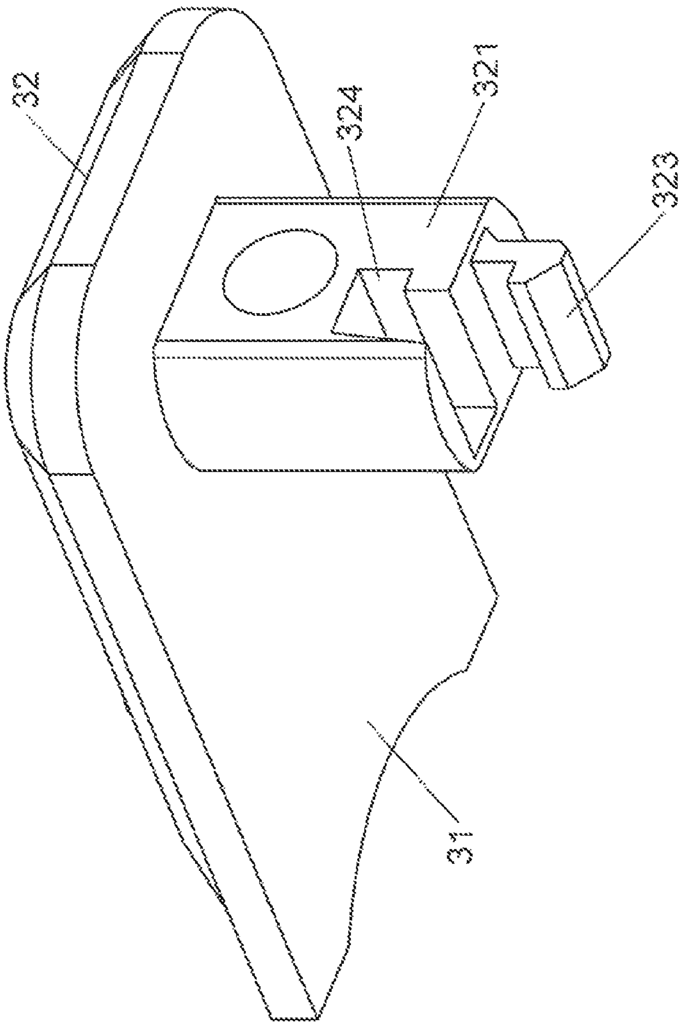
FIG. 15 is a partial perspective view of a third body module of the box-end tool structure in accordance with another preferred embodiment of the present invention.

Referring to FIG. 15, the first locking member 31 and the second locking member 32 are formed integrally.

As shown in FIG. 10, the sixth mounting portion 41 of the fourth body 40 is inserted into the first mounting portion 21 of the second body 20 from the second end 102. Alternatively, the sixth mounting portion 41 of the fourth body 40 is inserted into the first mounting portion 21 of the second body 20 from the first end 101.

As shown in FIG. 7, the fourth body 40 is a box-type socket, a box-type adaptor, a box-type connecting rod or a box-type float connector. Alternatively, the fourth body 40 has an end provided with a square head for mounting a hand tool with a square recess. Alternatively, the first body 10 and the second body 20 are formed integrally, so that the first body 10 is directly formed with the first mounting portion 21 and served as a box-end wrench.

Accordingly, the box-end tool structure of the present invention has the following advantages.

1. As shown in FIG. 14, the first locking portion 311 of one of the two third body modules 30 is locked in the first annular groove 42, and the first locking portion 311 of the other one of the two third body modules 30 is locked in the second annular groove 43, so that the fourth body 40 and the first body 10 have two locking positions and are locked firmly.
2. The first locking member 31 of one of the two third body modules 30 is mounted on the first end 101, and the first locking member 31 of the other one of the two third body modules 30 is mounted on the second end 102, so that the fourth body 40 is locked by the first locking members 31 of the two third body modules 30 from the first end 101 and the second end 102 of the first body 10. Thus, the first body 10 and the fourth body 40 are locked exactly.
3. The two third body modules 30 are assembled and moved simultaneously, so that the user only needs to drive one of the two third body modules 30 to move the two third body modules 30 simultaneously.
4. The first locking member 31, the second locking member 32, the first elastic member 33, and the first push member 34 are assembled easily so that each of the two third body modules 30 is assembled previously outside of the first body 10.
5. When one of the two third body modules 30 is released by the user, each of the two third body modules 30 is pushed by the restoring force of the first elastic member 33 and returned to the original position.

Figure 3:
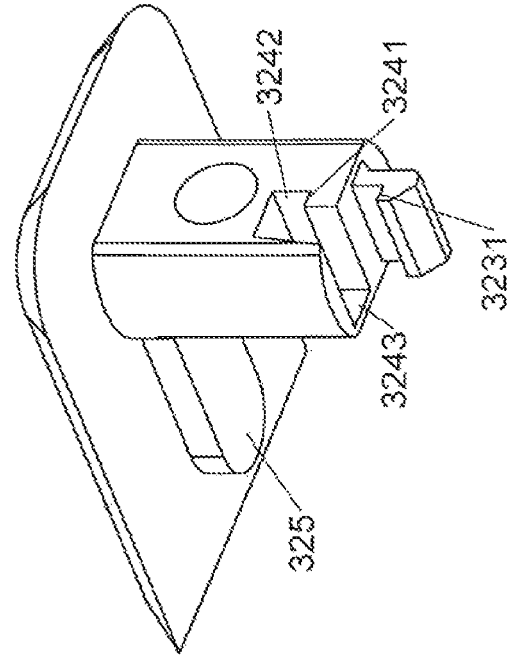
FIG. 3 is a perspective view of a second locking member of the box-end tool structure in accordance with the preferred embodiment of the present invention.
Figure 2:
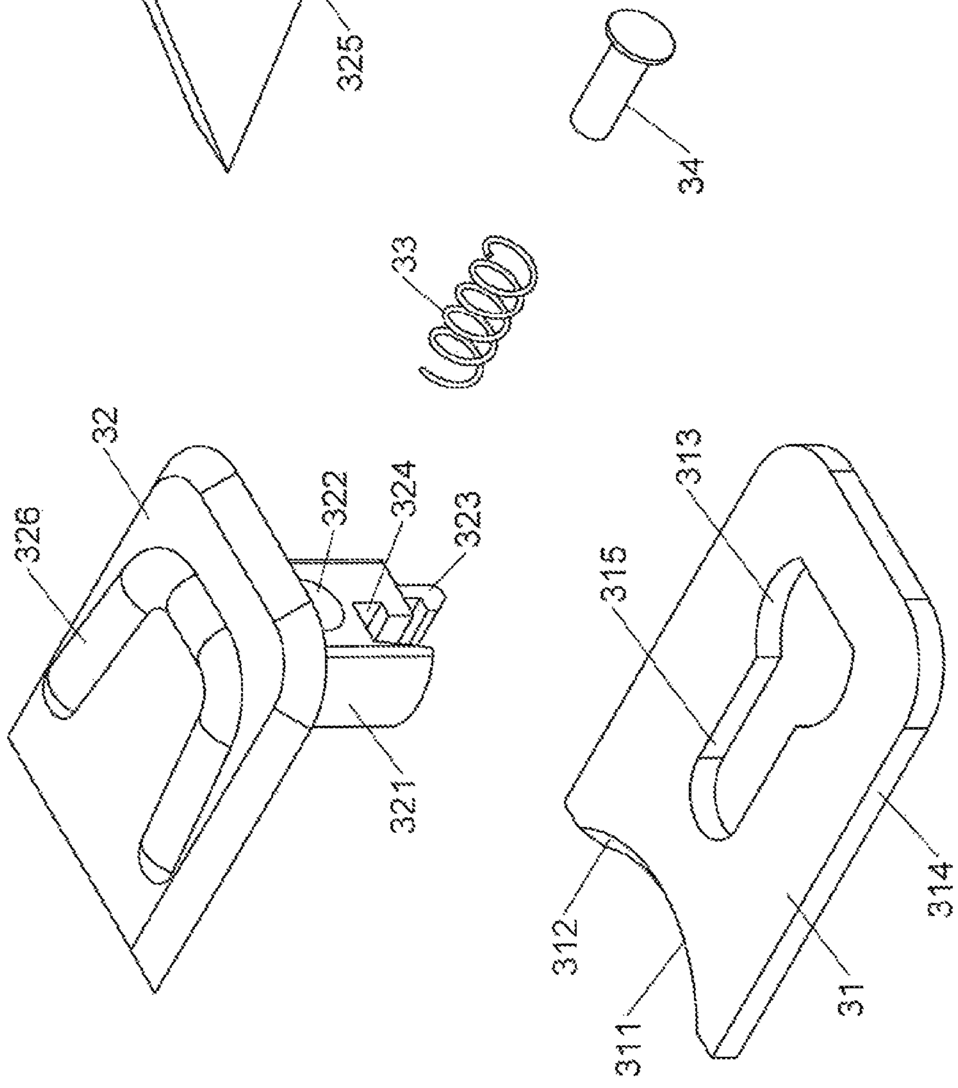
FIG. 2 is an exploded perspective view of a third body module of the box-end tool structure in accordance with the preferred embodiment of the present invention.
Figure 5:
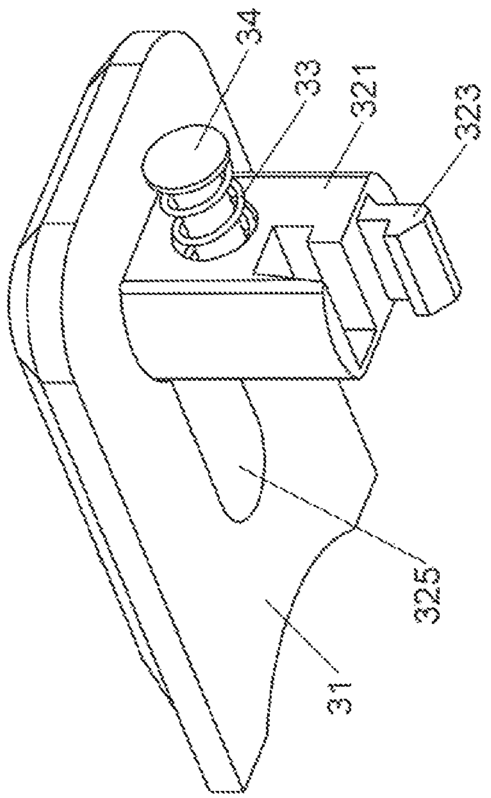
FIG. 5 is another perspective assembly view of the third body module of the box-end tool structure as shown in FIG. 2.
Figure 4:
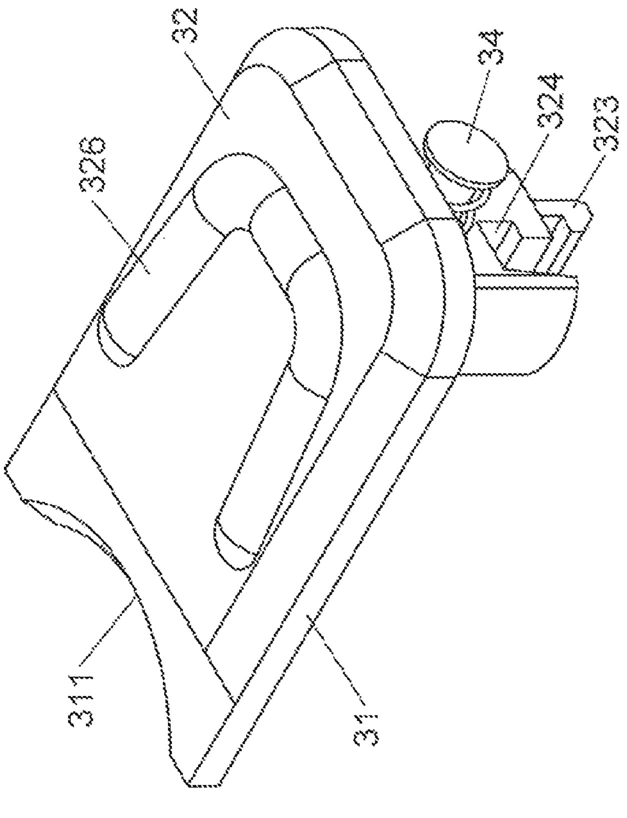
FIG. 4 is a perspective assembly view of the third body module of the box-end tool structure as shown in FIG. 2.

6. The first inclined face 312 is directed outward relative to the first body 10, so that when the fourth body 40 is inserted into the first mounting portion 21, each of the two third body modules 30 is moved by the fourth body 40 and locked on the fourth body 40 automatically. Thus, the fourth body 40 is directly locked by the two third body modules 30 without having to drive the two third body modules 30 by the user's hands, so that the fourth body 40 is assembled with the first body 10 easily, thereby facilitating the user mounting the fourth body 40 on the first body 10.
7. The two third body modules 30 are arranged symmetrically relative to the first body 10. The fourth body 40 is inserted into the second body 20 from the second end 102 or from the first end 101, so that the fourth body 40 is mounted on the first body 10 in two different directions according to the practical requirement.
8. The first locking member 31 is made of material having greater strength so that the fourth body 40 is locked steadily by the first locking members 31 of the two third body modules 30. The second locking member 32 is made of plastic material to decrease the cost of production. The second locking members 32 of the two third body modules 30 are locked easily.
9. The first body 10 is formed with the two first receiving grooves 11 by working, and formed with the first slot 14 by drilling, so that the first body 10 has a lower working cost.
10. Each of the two third body modules 30 is formed with the first projection 326 to facilitate the user driving and moving the two third body modules 30.
11. As shown in FIG. 3, the second locking member 32 is made of plastic material. The open end 3242 has an opening directed in a direction the same as that of the opening of the second receiving groove 322. In such a manner, the die of the second locking member 32 is opened and released in the direction of the opening of the second receiving groove 322 and in the other direction, so that the die of the second locking member 32 does not need a movable slide, thereby reducing the necessary part, and thereby decreasing the cost of fabrication.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A box-end tool structure comprising:

a first body, a second body, two third body modules, and a fourth body;

wherein:

the first body is a ratchet wrench, a one-way ratchet wrench or a box end wrench;

the first body is provided with a first end, a second end, and a third end;

the first end and the second end are opposite to each other;

the third end is provided with a handle;

the first body is provided with two first receiving grooves formed in the first end and the second end respectively;

the two first receiving grooves are arranged symmetrically relative to the first body;

each of the two first receiving grooves is provided with a first face and two second faces;

the first face has a planar shape;

the two second faces are arranged symmetrically relative to the first face;

an angle is defined between each of the two second faces and the first face;

the first body is provided with a first slot penetrating the first body;

the first slot has a circular shape and is connected to the two first receiving grooves;

the second body is mounted on the first body;

the second body is provided with a first mounting portion distant from the first slot;

the first mounting portion is a noncircular recess;

the second body is provided with two third faces formed on two ends of the second body;

each of the two third faces has a planar shape and is flush with the first face of one of the two first receiving grooves;

the two third body modules are mounted on the first slot;

the two third body modules are moved in the first slot linearly and simultaneously to be close to or away from the second body;

one of the two third body modules is mounted on the first end, and the other one of the two third body modules is mounted on the second end;

the two third body modules are arranged symmetrically relative to the first body;

each of the two third body modules includes a first locking member, a second locking member, a first elastic member, and a first push member;

the first locking member is received in one of the two first receiving grooves and moved linearly on the first face;

the first locking member is provided with a first locking portion close to the first mounting portion;

the first locking portion is a flange with a concave face;

the first locking portion is provided with a first inclined face directed outward relative to the first body;

the first inclined face of one of the two third body modules is directed toward an outside of the first end, and the first inclined face of the other one of the two third body modules is directed toward an outside of the second end;

the first inclined faces of the two third body modules are arranged symmetrically relative to the first body;

the first locking member is provided with a second mounting portion that is distant from the first locking portion and penetrates the first locking member;

the second mounting portion is a noncircular groove;

the first locking member is provided with two fourth faces aligning with and sliding relative to the two second faces;

the first locking member is provided with a third mounting portion penetrating the first locking member and connected to the second mounting portion;

the third mounting portion is a noncircular groove;

the second locking member is assembled with the first locking member and provided with a fourth mounting portion;

the fourth mounting portion is mounted in the second mounting portion so that the second locking member and the first locking member are moved simultaneously;

the fourth mounting portion is movably mounted in the first slot and hidden in the first body;

the second locking member is provided with a second receiving groove having an opening directed toward a direction opposite to the second body;

the fourth mounting portion has a distal end provided with a first hooked portion;

the second locking member is provided with a second hooked portion;

the second hooked portion of one of the two third body modules is hooked with the first hooked portion of the other one of the two third body modules so that the two third body modules are assembled;

the second locking member is provided with a fifth mounting portion mounted in the third mounting portion;

the second locking member is provided with a first projection;

the first projection is a protruding block;

the first elastic member is received in the second receiving groove to provide a restoring effect to each of the two third body modules;

the first push member is assembled with the first elastic member and received in the second receiving groove;

the first elastic member is elastically biased between the second receiving groove and the first push member;

the first push member has an end pressing an inner peripheral face of the first slot;

the fourth body is a box-type hand tool;

the fourth body is provided with a sixth mounting portion mounted in or released from the first mounting portion;

the sixth mounting portion is a noncircular shank;

the fourth body is provided with a first annular groove and a second annular groove;

the sixth mounting portion is arranged between the first annular groove and the second annular groove;

the first locking member of each of the two third body modules is locked in the first annular groove or the second annular groove;

the first annular groove and the second annular groove have the same diameter and the same structure;

the fourth body has an end provided with a second inclined face;

the fourth body is provided with a first peripheral face having a diameter more than that of the first annular groove;

the first peripheral face has an annular shape;

the fourth body is provided with a first locking face having a planar shape;

the fourth body is provided with a third inclined face;

the third inclined face and the second inclined face are directed in the same direction;

the fourth body is provided with a second locking face having a planar shape; and the second inclined face, the first peripheral face, the first locking face, the first annular groove, the third inclined face, the sixth mounting portion, the second locking face, and the second annular groove are arranged serially on the fourth body from top to bottom.

2. The box-end tool structure as claimed in claim 1, wherein:

the opening of the second receiving groove is directed toward the third end; and the second receiving groove has a circular shape.

3. The box-end tool structure as claimed in claim 1, wherein the second body is a ratchet wheel structure that is one-way rotatable relative to the first body.

4. The box-end tool structure as claimed in claim 1, wherein:

the first hooked portion has a projected shape and is provided with a first fixing section;

the second hooked portion is close to the first hooked portion;

the second hooked portion has a recessed shape and is provided with a second fixing section;

the second hooked portion is provided with an open end having an opening directed in a direction the same as that of the opening of the second receiving groove;

the second hooked portion is provided with a closed end having a planar shape;

the second fixing section of one of the two third body modules is hooked with the first fixing section of the other one of the two third body modules so that the two third body modules are assembled.

5. The box-end tool structure as claimed in claim 4, wherein:

the fourth mounting portions of the two third body modules are inserted into the first slot and align with each other, with the second hooked portion of one of the two third body modules being hooked with the first hooked portion of the other one of the two third body modules, and the second fixing section of one of the two third body modules being hooked with the first fixing section of the other one of the two third body modules, so that the two third body modules are assembled by the first fixing section and the second fixing section; and the two third body modules are limited in the first slot and cannot be detached from each other.

6. The box-end tool structure as claimed in claim 1, wherein the first elastic member is a spring.

7. The box-end tool structure as claimed in claim 1, wherein when the two third body modules are assembled with the first body, each of the two third body modules is assembled previously, with the second mounting portion being mounted on the fourth mounting portion, the third mounting portion being mounted on the fifth mounting portion, and the first elastic member and the first push member being mounted in the second receiving groove.

8. The box-end tool structure as claimed in claim 1, wherein:

when the second body is mounted on the fourth body, the sixth mounting portion is inserted into the first mounting portion, and the first inclined face is pressed and pushed by the second inclined face, so that the first locking member is driven to move the second locking member toward the third end, and the first elastic member is compressed by the second locking member;

after the second inclined face and the first peripheral face passes the first locking portion, the fourth body is moved successively, and the first locking member and the second locking member are elastically pushed by the first elastic member and moved toward the second body, so that the first locking portion is inserted into the first annular groove;

when the fourth body is further moved toward the first mounting portion, the first inclined face is pressed and pushed by the third inclined face, so that each of the two third body modules is driven and moved toward the third end;

when the sixth mounting portion passes the first locking member, the first locking face is locked by the first locking portion of one of the two third body modules, and the second locking face is locked by the first locking portion of the other one of the two third body modules, so that the fourth body is locked by the first body; and when one of the two third body modules is moved, the two third body modules are moved simultaneously, so that the first locking face is unlocked from the first locking portion of one of the two third body modules, and the second locking face is unlocked from the first locking portion of the other one of the two third body modules, to unlock the fourth body from the first body.

9. The box-end tool structure as claimed in claim 1, wherein the first locking member and the second locking member are formed integrally.

10. The box-end tool structure as claimed in claim 1, wherein:

the fourth body is a box-type socket, a box-type adaptor, a box-type connecting rod or a box-type float connector; and the fourth body has an end provided with a square head for mounting a hand tool with a square recess.

11. The box-end tool structure as claimed in claim 1, wherein the first body and the second body are formed integrally, so that the first body is directly formed with the first mounting portion and served as a box-end wrench.

* * * * *